(12) United States Patent
Friedrich et al.

(10) Patent No.: US 8,766,645 B2
(45) Date of Patent: Jul. 1, 2014

(54) METHOD AND DEVICE FOR TRACKING THE DEGRADATION OF INSULATORS IN A ROTARY MACHINE

(75) Inventors: Gérard Friedrich, Roissy en Brie (FR); Marie Jaillet-Delclaud, Juvisy sur Orge (FR); Emilie Renouard-Mouren, Paris (FR); David Laurent, Le Perray en Yvelines (FR); Bernard Mineur, Paris (FR); Emmanuel Odic, Pontault-Combault (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 178 days.

(21) Appl. No.: 13/062,609

(22) PCT Filed: Sep. 3, 2009

(86) PCT No.: PCT/FR2009/051661
§ 371 (c)(1),
(2), (4) Date: Apr. 21, 2011

(87) PCT Pub. No.: WO2010/031942
PCT Pub. Date: Mar. 25, 2010

(65) Prior Publication Data
US 2011/0203276 A1  Aug. 25, 2011

(30) Foreign Application Priority Data

Sep. 18, 2008  (EP) .................................... 08305567

(51) Int. Cl.
*G01N 27/00*  (2006.01)
*G01R 31/00*  (2006.01)
*H02K 11/00*  (2006.01)
*F01K 13/02*  (2006.01)

(52) U.S. Cl.
USPC ........... 324/557; 324/464; 324/512; 324/536; 60/646; 29/592.1

(58) Field of Classification Search
CPC ..... G01R 31/12; H02K 11/00; H02K 11/001; B01D 53/30; F01K 13/00
USPC ........................ 60/645–647, 223; 73/23.2, 86; 29/592.1, 592, 596; 95/8; 324/512, 324/520, 536, 551, 71.1, 464, 557, 717
See application file for complete search history.

(56) References Cited

U.S. PATENT DOCUMENTS 3,972,225 A * 8/1976 Fort et al. ..................... 73/28.04
4,080,535 A * 3/1978 Phillips et al. ................ 250/381

(Continued)

FOREIGN PATENT DOCUMENTS

| JP | 59060366 | 4/1984 |
| JP | 03-277118 | 12/1991 |
| JP | 2000-155150 | 6/2000 |

OTHER PUBLICATIONS

Tavner, Peter; Ran, Li; Penman, Jim; Sedding, Howard. Condition Monitoring of Rotating Electrical Machines. Institution of Engineering and Technology. (c) 2008). p. 137-142, 236-238. ISBN: 978-0-86341-739-9.*

(Continued)

*Primary Examiner* — Thomas Denion
*Assistant Examiner* — Laert Dounis
(74) *Attorney, Agent, or Firm* — Justin K. Murray

(57) ABSTRACT

A method for tracking the deterioration of the insulators in a rotating machine, a method for preventive maintenance of these machines using this tracking and devices using the tracking method is presented.

8 Claims, 2 Drawing Sheets

(56) References Cited

U.S. PATENT DOCUMENTS

| | | | | |
|---|---|---|---|---|
| 5,550,631 | A | * | 8/1996 | Shapanus et al. ............. 356/300 |
| 5,675,188 | A | * | 10/1997 | Utamura .......................... 290/52 |
| 5,741,124 | A | * | 4/1998 | Mazzucato et al. ............ 417/415 |
| 6,076,411 | A | * | 6/2000 | Horvath ............................ 73/866 |
| 6,998,618 | B2 | * | 2/2006 | Twerdochlib ............ 250/370.02 |
| 7,369,057 | B2 | * | 5/2008 | Twerdochlib et al. ......... 340/679 |
| 7,605,712 | B2 | * | 10/2009 | Twerdochlib et al. ......... 340/679 |
| 7,676,333 | B2 | * | 3/2010 | Younsi et al. .................... 702/58 |
| 2002/0079764 | A1 | * | 6/2002 | Cook ............................... 310/89 |
| 2007/0063859 | A1 | | 3/2007 | Twerdochlib et al. |
| 2008/0088314 | A1 | * | 4/2008 | Younsi et al. .................. 324/457 |

OTHER PUBLICATIONS

"Overview of Hydrogenerator Stator Winding Monitoring". G.C. Stone—Iris Power Engineering. 1999.*

Belec, M. et al, "Investigation and Diagnosis of a 184-MVA Air-Cooled Generator Heavily Affected by Slot Partial Discharge Activity", Electrical Insulation Conference and Electrical Manufacturing Expo, 2007 IEEE, Piscataway, NJ, USA, Oct. 22, 2007, pp. 85-90, XP031285179, ISN: 978-1-4244-9.

Sorita, T. et al. "On-Line Detection of Overheating Material in Turbine Generators Using Chemical Analysis" Electrical Insulation and Dielectric Phenomena, 1999, 1999 Annual report Conference. Austin, Texas, US Oct. 17-20, 1999, Piscataway, NJ, USA IEEE, US, vol. 2, pp. 533-536, XP010359378, ISBN: 978-0-7803-5414-2.

Sorita, T., et al., "A Novel On-Line Method and Equipment to Detect Local Problems in Turbine Generators" Electrical Insulation and Dielectric Phenomena, 2000 Annual Report Conference, Oct. 15-18, 2000, Piscataway, NJ, USA IEEE, vol. 2, pp. 552-555, XP010522078, ISBN: 978-0-7803-6413-4.

PCT Search Report for PCT/FR2009/051661.

JP 2011-527371, Office Action issued Mar. 4, 2014 (3 pp).

* cited by examiner

METHOD AND DEVICE FOR TRACKING THE DEGRADATION OF INSULATORS IN A ROTARY MACHINE

This application is a §371 of International PCT Application PCT/FR2009/051661, filed Sep. 3, 2009.

BACKGROUND

1. Field of the Invention

The present invention relates to a method for tracking the deterioration of the insulators in a rotating machine, a method for preventive maintenance of these machines using this tracking and devices using the tracking method.

2. Related Art

The manufacturers and users of rotating machines are often confronted by the behavior over time of the insulators that are present in the stator and the rotor (when they are wound) of these items of equipment. The latter create conditions promoting the appearance of partial electrical discharges in or in the vicinity of the insulators and the latter can in return contribute to the damaging of the insulators. All this in the end can cause electric failures leading to operating shutdowns, penalties or indirect expenses, costs of rewinding the stators and the rotors, or even the partial or complete replacement of the equipment.

Today, there is a certain number of solutions for monitoring the phenomenon of partial discharges and/or the state of the insulators. It is possible to cite in particular:

- the electrical measurement of the partial discharges by capacitive coupler, which is the most widespread. It is based on measuring current transients in the windings due to the partial discharges. Usually, the method uses couplers installed in the motors, which couplers measure the frequency and the charge corresponding to these transient currents. This method makes it possible to evaluate the level of partial discharges in the stators of the rotating machines without it being necessary to shut the machine down. The data obtained by this method require interpretation and therefore a good knowledge of the partial discharge phenomena. It gives only an evaluation of the number and the amplitude of the partial discharges, but no indication of their impact on the insulation.
- the measurement called the insulation resistance measurement: this measurement is taken with the motor shut down. It consists in applying a direct-current voltage between the conductor windings and the metal ground of the stator or of the rotor and in measuring the resistance of the electrical insulation between these two elements. Ideally this resistance is infinite but in practice it is not. The weaker the insulation resistance, the greater the likelihood of having an insulation problem. This measurement cannot be taken when the motor is operating and is extremely sensitive to temperature.
- the measurement of the polarization index: this is a variant of the measurement of the insulation resistance which consists in computing the ratio between the insulation resistance after having applied the voltage to the insulator for ten minutes and the resistance obtained after one minute. A low polarization index usually indicates contamination of the insulator (oil, grease, etc.). This measurement is less sensitive to temperature than the insulation resistance measurement.
- the Hipot test: it consists in applying a high direct-current voltage to the windings. If there is a defect in the insulation, it will cause, because of the voltage applied, a break in the insulation at this point. This test can be carried out only with the motor shut down and can be destructive.
- the detection of certain types of gases created by the ionization of the air, a consequence of the corona or surface discharges. These methods relate mainly to ozone and NOx.
- the measurement of the Ohm's law difference.
- the measurement of the tangent delta.
- the Terase criterion.

All these methods have a certain value, but they require either the systematic shutting down of the motor, or an awkward interpretation of the partial discharge phenomenon in terms of impact on the insulators. This interpretation is often hazardous, because the characterization of the partial discharges is only indirectly linked to the state of the insulators.

It is possible to cite also other methods which make it possible to characterize partial discharges, but which do not seem to be suitable for the situation of rotating machines:

- measurement of the thermal wave, using space charges trapped in the insulator caused by various phenomena (ionization, polarization, etc.). The method consists in applying a temperature difference which induces a current dependent on the electric field originating from these space charges. It is usually applied to insulated electric cables.
- acoustic measurement, which detects the ultrasound emissions produced at the time of the discharges. The method is particularly suitable for transformers.

SUMMARY OF THE INVENTION

One objective of the present invention is to alleviate all or some of the drawbacks of the prior art listed above.

First, the invention relates to a method for tracking the deterioration of insulators in a rotating machine comprising at least a rotor and a stator placed in an enclosure defining an internal atmosphere comprising at least 90% of air by volume, and optionally a cooling system for cooling this atmosphere, characterized in that it comprises the following steps:

(a) measuring the concentration(s) of CO (carbon monoxide) and the concentration(s) of $NO_2$ (nitrogen dioxide) and/or $O_3$ (ozone) at one or more random locations situated in or in contact with the gases forming the internal atmosphere of said rotating machine, and (b) viewing, signaling and/or storing the results of said measurement.

According to the invention, the rotating machine in question may be an electricity-consuming device producing a mechanical energy in the form of a torque exerted by the rotor, and a device generating electric energy from the mechanical energy transmitted to its rotor. The devices in question most frequently operate at a voltage of at least 3 kV. The rotor and the stator are usually covered with an insulating material the deterioration of which needs to be tracked. According to a particular aspect, the rotating machine is a compressor or a booster.

The rotating machine is itself placed in a protective enclosure, for example a casing. This enclosure usually has a number of openings in order to allow in particular electric cables, gases, etc. to pass through. It is however such that the gases present around the rotor and the stator do not mix at all or very little with the atmosphere outside the enclosure. The internal atmosphere of the rotating machine is usually cooled, either by aeration hatches, or by a more sophisticated system that may comprise means for setting this atmosphere in motion and a heat exchanger in which the gases forming this atmosphere circulate.

The internal atmosphere comprises essentially, that is to say more than 90% by volume, air. The inventors have noticed that this atmosphere has a specific composition, comprising not only the gas types originating from the ionization of the air, but also at certain times, carbon monoxide in a detectable quantity. They have also established that this quantity of CO varies in a way that can be correlated with the state of deterioration of the insulators in a more pertinent manner than by using the quantities of the types originating from the ionization of the air. In particular, they have revealed that the quantity of CO increases considerably before the insulators fail.

Specifically it will be seen in the following description, notably of FIG. 2, that measuring the CO must be associated with measuring the $NO_2$ and/or the ozone. The latter measurements are taken using methods similar to those of the CO. The sensors measuring these new types may be new sensors, distinct from those measuring the CO, or else the same ones. These are then called "multi-type" sensors, capable of measuring simultaneously or successively the concentration of several considered gas types.

In order to carry out step (a) for measuring the CO, CO sensors can be placed in random locations in or in contact with the gases forming or originating from said internal atmosphere. They may also be situated around the gases, if the measurement is not taken by contact. They are positioned according to their geometry, their respective operation (electrochemical, radiation, etc.), so as to obtain, preferably continuously, whether or not simultaneously, one or more values of concentration of CO at various points or zones and not to hamper the smooth running of the rotating machine.

In step (b), the possible use of these results is prepared by viewing them, for example, on a screen close to the rotating machine or in a control room, or by signaling them, for example by one or more audible signals corresponding to predefined events, and/or by storing them for the purpose of remote and/or subsequent processing.

According to a particular embodiment, the invention may comprise one or other of the following features:
said measurements are taken with the aid of one or more sensors placed:
at a random location in the air gap of said rotating machine or on its stator, or
at a random location on the internal wall of said enclosure or else on a hatch of said enclosure, or
on the wall or within the optional cooling system for cooling said rotating machine, or
at a random location in the pumping system extracting a portion of the internal atmosphere from said rotating machine.

The locations that are favorable to the measurement are notably in the air gap of the machine, that is to say between the rotor and the stator, either within this air gap or else directly on the stator. The sensors may also be placed on the internal wall of the enclosure or close by, in the optional cooling system for cooling the rotating machine or in a dedicated pump which aspirates a portion of the gases forming the internal atmosphere of the rotating machine. The advantage of these last two possibilities is that they provide a gas mixture close to the average composition of the internal atmosphere. The measure is no longer local, but relates to the whole internal atmosphere. It is also possible advantageously to use sensors that themselves already produce an average of concentrations, by using for example optical or spectroscopic techniques. It is then possible to obtain a measurement representative of the average of the concentrations on an optical path entering the air gap for example.

According to another aspect, the invention also relates to a method for the preventive maintenance of a rotating machine, characterized in that it comprises the following steps:
(i) tracking the deterioration of the insulators of said rotating machine according to any one of the methods defined above,
(ii) analyzing the measurement results from said tracking, for example detecting a considerable increase in the concentration of CO, in particular if the concentrations of $O_3$ and/or $NO_2$ do not increase simultaneously, or else a change in the speed of increase in the concentration of CO, and
(iii) taking maintenance action that is decided on a basis that incorporates at least the analysis made in step (ii).

In this novel aspect of the invention, the tracking method defined above as the first step is used as a method for preventive maintenance of the rotating machine. When the aforementioned measurements have been collected, they are, during a second step, analyzed over time, in order to detect a change in the concentrations of the aforementioned gas types and/or in their speed of change, and/or any combination of these criteria, said change being the sign of a deterioration of an insulator. It is possible to cite in particular as a determinant criterion an increase in the concentration of CO concomitant with a stagnation or a reduction in the concentration of $NO_2$ and/or of the concentration of $O_3$.

The analysis may be relative in nature in the sense that the content of the various types may depend on the specifics of the rotating machine in question, on the measurement location, on the degree of mixing of the gases or else on the measurement technique. It is possible to remove this relativity by introducing a calibration step before the analysis, so as to adapt the analysis criteria, in particular the thresholds of concentration or of speed of increase in the concentrations. It is also possible to make use of nonrelative analysis criteria, such as a considerable increase, relative to the past values, or a sharp increase in one of the types and not correlated with an increase in another type.

Other data collected by other methods can complete this table.

The result of the analysis is whether or not to shut down the rotating machine for a more in-depth inspection, optionally followed by an effective maintenance operation on the machine. It can therefore be seen that the method makes it possible to limit the number of unnecessary shutdowns of the rotating machine and to prevent failures that may go so far as to destroy the stator and the rotor.

In particular, the maintenance action may comprise the following steps:
(iii-a) stopping said rotating machine,
(iii-b) carrying out a visual inspection and/or one or more tests of the state of the insulators of this machine (for example measuring the insulation resistance or the polarization index), and/or
(iii-c) carrying out a possible intervention on the rotating machine.

According to a particular mode of the aforementioned methods, said rotating machine is:
an electric motor driving an industrial compressor of gas, in particular air, oxygen, nitrogen, argon, hydrogen, carbon monoxide or carbon dioxide, synthesis gas, or
an electricity generator forming part of a unit for the cogeneration of electricity and a hot fluid, for example steam, or of a combined cycle, or an electric motor driving a pump, in particular a water pump.

This embodiment relates to the main rotating machines used in the field of industrial gases, compressor motors, electricity generators and pumps, in particular water pumps, for which it is important to minimize the operating interruptions. These days, shutdowns for programmed maintenance of these machines are increasingly far apart. It is becoming increasingly useful to be able to detect any abnormal deterioration in the insulators of these machines during the increasing time gaps between the planned shutdowns.

The invention also relates to a device for tracking the deterioration of the insulators of a rotating machine comprising at least a rotor and a stator placed in an enclosure defining an internal atmosphere comprising at least 90% of air by volume, and optionally a cooling system for cooling this atmosphere, characterized in that it comprises at least:
- one or more sensors each delivering a signal representative of a concentration of CO and placed in or in contact with the gases forming the internal atmosphere of said rotating machine,
- one or more sensors for sensing the concentration of $NO_2$ and/or of $O_3$ placed in or in contact with the gases forming the internal atmosphere of said rotating machine,
- one or more electronic circuit boards connected to these sensors and used to adapt the signals of the sensors, said boards optionally being distinct from the sensors,
- one or more modules for the acquisition and possible storage of the signals adapted by the electronic circuit boards, and
- one or more modules for the signaling and/or the viewing and/or the transmission by electric cables or by radio waves of these processed signals.

In this device, the sensors each deliver a signal transmitted to one or more electronic circuit boards of conventional construction. For example, these sensors may have an electrical resistance associated with the concentration of one of the gas types in question. Their resistance is then linked electrically to an electronic circuit board which will convert this variable resistance for example into a voltage, while filtering and stabilizing the signal thereof. The electronic circuit board or boards may be situated close to the sensors or at a certain distance of the acquisition module(s), for example in a common housing.

These signals are then viewed and/or transmitted electrically or by radio waves, for example by SMS.

According to particular modes, this device may have some of the following features:
- the CO sensor or sensors also make it possible to measure concentrations of $NO_2$ and/or $O_3$.
- the sensor or sensors are situated:
  - at a random location in the air gap of said rotating machine or on its stator, or
  - at a random location on the internal wall of said enclosure or else on a hatch of said enclosure, or
  - on the wall or within the optional cooling system for cooling said rotating machine, or
  - at a random location in a pumping system extracting a portion of the gases forming the internal atmosphere of said rotating machine.

The sensors in question may be monotype (measuring the concentration of a single gas type) or multi-type (measuring the concentration of several types, whether or not simultaneously).

The invention also relates to a compressor of industrial gas in particular air, oxygen, nitrogen, argon, hydrogen, carbon monoxide or carbon dioxide, synthesis gas, driven by an electric motor and characterized in that said motor is furnished with any one of the tracking devices defined above.

Similarly the invention relates to an electricity generator forming part of a unit for the cogeneration of electricity and a hot fluid, for example steam, or of a combined cycle, characterized in that it is furnished with any one of the tracking devices defined above.

The cogenerated fluid may be steam or another "thermal" fluid such as hot oil.

Similarly the invention relates to a pump, particularly a water pump, driven by at least one electric motor and characterized in that said at least one motor is furnished with any one of the tracking devices defined above.

Also the invention relates by extension to a method for separating air or for production of one or more industrial gases, for example air, oxygen, nitrogen, argon, hydrogen, carbon monoxide or carbon dioxide, synthesis gas, characterized in that it uses one or more compressors as defined above.

Finally the invention relates by extension to a method for cogenerating electricity and a hot fluid, for example steam, or combined cycle, characterized in that it uses one or more generators as defined above.

BRIEF DESCRIPTION OF THE FIGURES

Other particular features and advantages of the invention will appear on reading the following description made with reference to the figures in which.

DETAILED DESCRIPTION OF THE INVENTION

Figure 1:
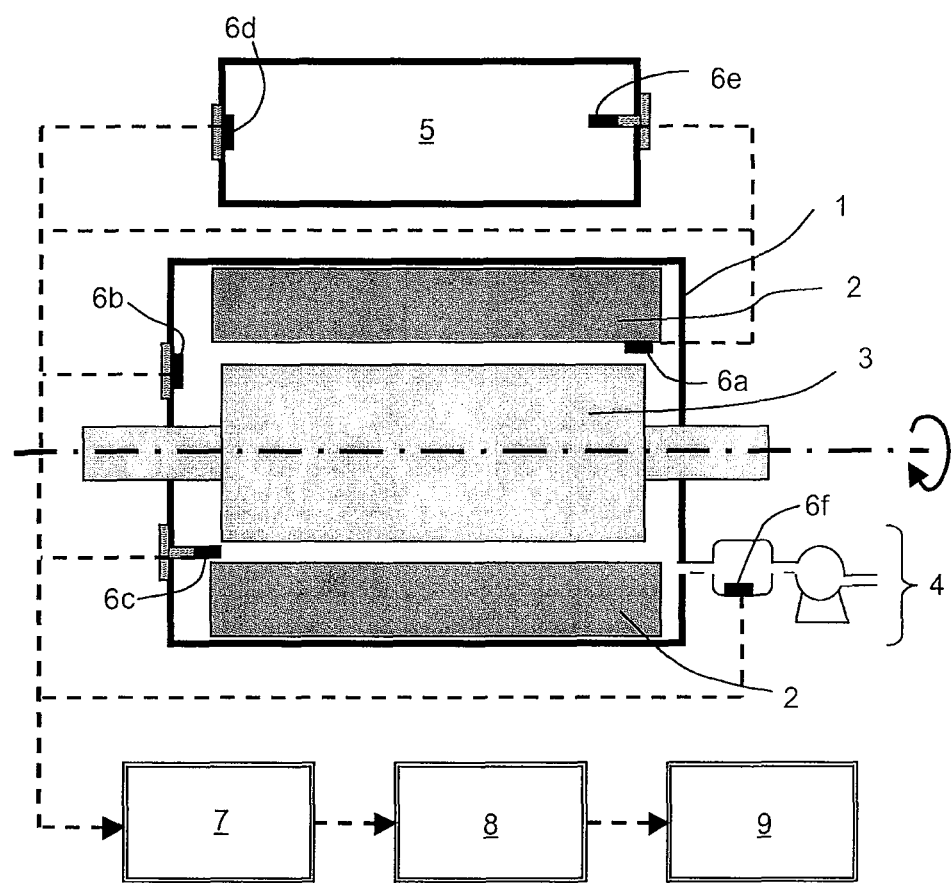
FIG. 1 represents a rotating machine fitted with a device according to the invention.

For a further understanding of the nature and objects for the present invention, reference should be made to the detailed description, taken in conjunction with the accompanying drawing, in which like elements are given the same or analogous reference numbers and wherein:

FIG. 1 shows schematically a device using, in a nonlimiting manner, the tracking method according to the invention, which is also the basis of a preventive maintenance method.

The rotating machine is in an enclosure or casing 1. Said enclosure defines an internal atmosphere in which there is a stator 2 and a rotor 3. Between these two elements there is a space called the "air gap". The rotating machine is also provided:
- with a cooling system 5 for cooling its internal atmosphere, which operates by exchanging the heat of the gases forming said internal atmosphere with a cold source (not shown),
- with a pump 4 making it possible to aspirate a portion of said internal atmosphere.

In or in contact with the gases forming this internal atmosphere, sensors 6 have been placed that are used to measure the concentration of CO. All these sensors also measure the concentration of $NO_2$ and $O_3$. These sensors are semiconducting oxide sensors. This technology in particular allows a miniaturization of the sensors (approximately 1 cm in diameter and 1 cm high). Moreover, it operates correctly at high temperature, up to more than 80° C. Other types of sensors could be used, for example based on spectroscopic techniques, notably in order to obtain a better chemical selectivity of the sensors. In FIG. 1, each sensor has three electric resistors each associated with the concentration of one of said gas types by a simple mathematical function. In this example, these are therefore tri-type sensors.

One of the sensors 6a is situated in the air gap of said rotating machine on the stator 2. A sensor 6b is situated against the internal wall of the enclosure 1; 6c is close to the enclosure 1 and in the air gap of said rotating machine; 6d is against the internal wall of the cooling system 5 which sees gases from the internal atmosphere of said rotating machine passing through. 6e is inside said cooling system 5, on the path of the gases originating from said rotating machine. 6f is in said pump 4 extracting a portion of the gases forming the internal atmosphere of said rotating machine.

These sensors are electrically connected to electronic circuit boards 7 which convert the three resistances of each sensor 6a to 6f into as many analog signals, for example voltages, by virtue of resistor bridges. These circuit boards 7 also perform conventional functions of filtering and of stabilizing these signals. The analog signals produced by the circuit boards 7 are sent to one or more modules 8 for acquisition and possible storage in digital form. These digital data are then given substance by the device 9, for example on a screen, and sent by SMS for remote processing.

The rotating machine shown may be a motor for compressing industrial gas, for example air, or an electricity generator, for example coupled to a gas turbine, or else a motor of an industrial water pump.

The results viewed or sent are then optionally analyzed according to the preventive maintenance method described above.

Figure 2:
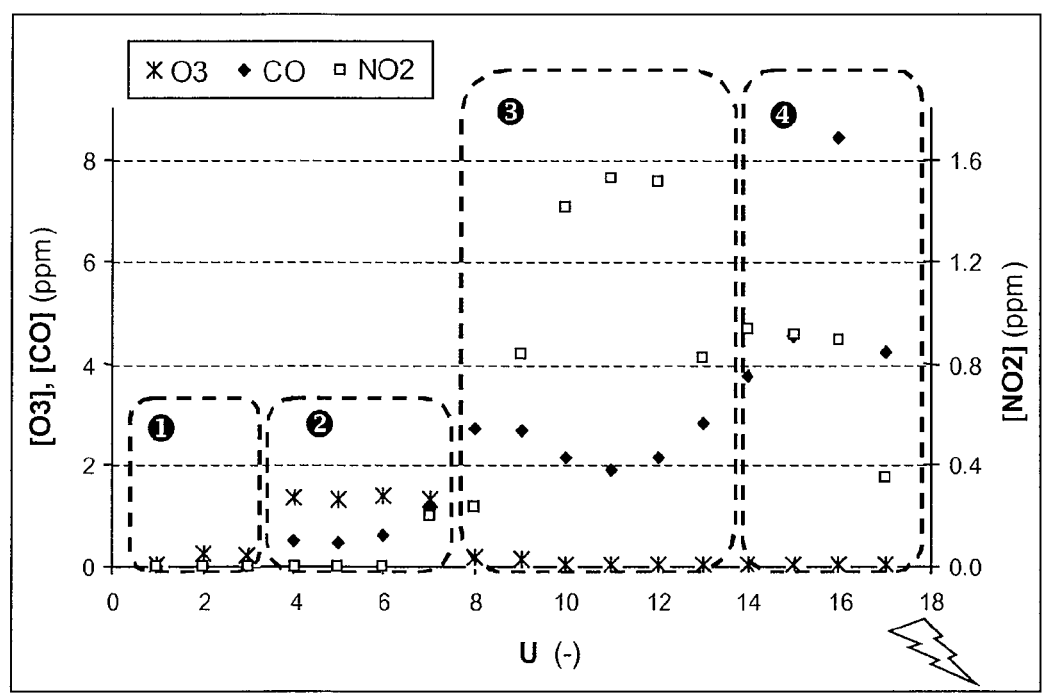
FIG. 2 represents a graph illustrating the link between the concentrations of CO, $NO_2$ and $O_3$ measured in the vicinity of an insulator subjected to an increasing voltage.

With reference to FIG. 2, the pertinence of the measurements on which the invention is based will now be shown.

The inventors have carried out numerous experiments to characterize the gas types that appear as a result of the partial discharges in the vicinity or in various types of insulators, and the types of sensors most suitable for detecting them.

The graph in FIG. 2 summarizes the results of one of these experiments in which:
- a material, a priori an insulating material, in this instance a disk of epoxy resin 1 mm thick, is subjected to electrical discharges in point-plane geometry on dielectric barrier,
- the voltage used to cause the discharges is gradually increased, which progressively raises the power of the discharges until the insulator fails, that is to say until there is an irreversible deterioration of the dielectric material practically depriving it of its insulating power,
- in a stream of clean air, with controlled humidity, the stable gas types formed during the discharges are collected,
- they are measured by various means, on the one hand the sensors of concentrations of $O_3$, $NO_2$ and CO mentioned above and on the other hand a visible-UV or infrared absorption spectrophotometer with Fourier transform as a specimen measurement,
- all these sensors are placed in or in contact with the humid air downstream of the electrical discharges.

In FIG. 2, the X axis represents the voltage U to which the insulator to be tested is subjected. The values have no dimension and go up to the failure voltage, symbolized by a lightning flash at the value 18. The Y axis on the left represents concentrations of $O_3$ and CO, while the Y axis on the right (or secondary axis) represents the concentration of $NO_2$. The concentrations are shown in ppm (parts per million), that is to say as a volume fraction.

In this axis system, the three curves represent the concentrations of CO, $NO_2$ and $O_3$ as a function of the power of the discharge applied to the insulator, from zero to the failure voltage. The graph has been divided into four zones shown by the dashed-line rectangles numbered 1 to 4.

Initially, the concentrations of these three gas types remain very low (zone ●). Then, with the discharge power increasing, ozone appears, and some carbon monoxide in very small quantities (zone ●). When the power of the discharges has increased sufficiently, the concentration of ozone falls, while a peak in the concentration of $NO_2$ takes shape and the concentration of carbon monoxide increases (zone ●). Shortly before the failure, the concentration of $NO_2$ reduces in its turn and a peak in concentration of carbon monoxide appears (zone ●).

Therefore, by multiplying this type of experiment, the inventors have been able to demonstrate that the increase in the concentration of carbon monoxide makes it possible to anticipate in an extremely pertinent manner the failure of the dielectrics, in particular if this increase is not accompanied by an increase in the concentration of $NO_2$ and/or $O_3$.

In the light of the above description and explanations, it can be understood that the main advantages of the invention are that it:
- supplements the electrical measurements currently used and makes the diagnosis of the state of the insulators reliable,
- provides a general method that applies to all types of insulators and any type of rotating machine,
- limits the number of shutdowns for inspection and the number of failures of rotating machines,
- can be based on low-cost tracking devices because the CO, $NO_2$ and/or $O_3$ sensors are relatively cheap,
- provides measurement results that are easily interpreted in terms of predominance, appearance and disappearance of gas types.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for the preventive maintenance of a rotating machine, by tracking the deterioration of insulators in a rotating machine comprising at least a rotor and a stator placed in an enclosure defining an internal atmosphere comprising at least 90% of air by volume, wherein said method comprises the following steps:
   (a) measuring the concentration of CO and the concentration of $NO_2$ and $O_3$, at one or more locations situated in or in contact with the gases forming the internal atmosphere of said rotating machine;
   (b) viewing, and/or signaling, and/or storing the results of said measurement;
   (c) analyzing the results of said measurement, by detecting a considerable increase in the concentration of CO, in the case where the concentrations of $O_3$ and $NO_2$ do not increase simultaneously; and
   (d) taking maintenance action that is decided on a basis that incorporates at least the analysis made in step (c).

2. The method of claim 1, further comprising a cooling system for cooling said internal atmosphere.

3. The method of claim 1, wherein said measurements are taken with the aid of one or more sensors placed:
   at a random location in the air gap of said rotating machine or on its stator, or
   at a random location on the internal wall of said enclosure or else on a hatch of said enclosure, or on the wall or within the optional cooling system for cooling said rotating machine, or at a random location in a pumping system configured to extract a portion of the internal atmosphere from said rotating machine.

4. The method as defined in claim 1, wherein the maintenance action comprises the following steps:

(d-1) stopping said rotating machine, (d-2) carrying out a visual inspection and/or one or more tests of the state of the insulators of the rotating machine, and/or (d-3) carrying out an intervention on the rotating machine.

5. The method of claim 1, wherein the maintenance action comprises the step of carrying out one or more tests of the state of the insulators of the rotating machine, wherein the test of the state of the insulator comprises measuring the insulation resistance or the polarization index.

6. The method as defined in claim 1, wherein said rotating machine is:

an electric motor driving an industrial compressor of gas, or an electricity generator forming part of a unit for the cogeneration of electricity and a hot fluid, or of a combined cycle, or an electric motor driving a pump.

7. The method as defined in claim 1, wherein said rotating machine is an electric motor driving an industrial compressor of gas, wherein said gas is selected from the group consisting of air, oxygen, nitrogen, argon, hydrogen, carbon monoxide, carbon dioxide, synthesis gas, and combinations thereof.

8. The method as defined in claim 1, wherein said rotating machine is an electricity generator forming part of a unit for the cogeneration of electricity and a hot fluid, wherein the hot fluid is steam.

* * * * *